United States Patent
Kawakami et al.

(10) Patent No.: US 10,628,234 B2
(45) Date of Patent: Apr. 21, 2020

(54) DATA PROCESSING APPARATUS, DATA PROCESSING METHOD, AND COMPUTER READABLE MEDIUM

(71) Applicant: MITSUBISHI ELECTRIC CORPORATION, Tokyo (JP)

(72) Inventors: Daisuke Kawakami, Tokyo (JP); Madoka Baba, Tokyo (JP); Yuta Atobe, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 20 days.

(21) Appl. No.: 15/768,339

(22) PCT Filed: Dec. 10, 2015

(86) PCT No.: PCT/JP2015/084705
§ 371 (c)(1),
(2) Date: Apr. 13, 2018

(87) PCT Pub. No.: WO2017/098643
PCT Pub. Date: Jun. 15, 2017

(65) Prior Publication Data
US 2018/0307542 A1    Oct. 25, 2018

(51) Int. Cl.
G06F 9/52 (2006.01)
G06F 13/10 (2006.01)
G06F 9/48 (2006.01)

(52) U.S. Cl.
CPC .............. *G06F 9/52* (2013.01); *G06F 9/4818* (2013.01); *G06F 13/10* (2013.01)

(58) Field of Classification Search
CPC ............ G06F 9/52; G06F 13/10; G06F 9/4818
See application file for complete search history.

(56) References Cited

U.S. PATENT DOCUMENTS

| | | |
|---|---|---|
| 2002/0040411 A1* | 4/2002 | Iwatani ................. G06F 3/0613 710/2 |
| 2004/0068625 A1* | 4/2004 | Tseng ................... G06F 13/364 711/151 |

(Continued)

FOREIGN PATENT DOCUMENTS

| | | |
|---|---|---|
| JP | 2004-362425 A | 12/2004 |
| JP | 2008-42730 A | 2/2008 |

(Continued)

OTHER PUBLICATIONS

International Search Report for PCT/JP2015/084705 (PCT/ISA/210) dated Mar. 15, 2016.

*Primary Examiner* — Tuan C Dao
(74) *Attorney, Agent, or Firm* — Birch, Stewart, Kolasch & Birch, LLP

(57) ABSTRACT

When data output is requested by an application whose default output setting is set ineffective among a plurality of applications, an output setting updating part (120) updates an output setting of the requesting application from ineffective to effective and updates an output setting of another application which outputs data to the same output destination as the output destination of the requesting application and whose default output setting is set effective, from effective to ineffective. An output control part (160) outputs data of an application whose output setting is effective.

8 Claims, 15 Drawing Sheets

(56) References Cited

U.S. PATENT DOCUMENTS

| | | | |
|---|---|---|---|
| 2007/0194759 A1* | 8/2007 | Shimizu | H02J 7/0016 320/166 |
| 2010/0057967 A1* | 3/2010 | Murakami | G06F 9/5083 710/264 |
| 2010/0329272 A1 | 12/2010 | Tsuboi et al. | |
| 2011/0078694 A1 | 3/2011 | Kishita | |
| 2012/0119882 A1* | 5/2012 | Horst | G06K 7/0008 340/10.1 |
| 2012/0303216 A1 | 11/2012 | Yoshimura et al. | |
| 2013/0205302 A1* | 8/2013 | Nakagawa | G06F 9/5005 718/104 |
| 2014/0337593 A1* | 11/2014 | Holbrook | G06F 3/0614 711/162 |
| 2016/0117267 A1* | 4/2016 | Witt | G06F 21/6218 711/111 |

FOREIGN PATENT DOCUMENTS

| | | |
|---|---|---|
| JP | 2009-137382 A | 6/2009 |
| JP | 2010-30506 A | 2/2010 |
| JP | 2010-231407 A | 10/2010 |
| JP | 2010-245794 A | 10/2010 |
| JP | 2011-170626 A | 9/2011 |
| WO | WO 2016/042588 A1 | 3/2016 |

* cited by examiner

Fig. 3

PARAMETER TABLE (EMBODIMENT 1)

| OUTPUT ID | APPLICATION ID | CYCLE | OUTPUT TIMING | ACCESS TYPE | OUTPUT DESTINATION | DEFAULT OUTPUT SETTING | PRIORITY |
|---|---|---|---|---|---|---|---|
| 1 | APPLICATION 111 | 100ms | 60ms | Digital Output | DEVICE 200 | EFFECTIVE | LOW |
| 2 | APPLICATION 112 | 20ms | 10ms | Digital Output | DEVICE 200 | INEFFECTIVE | HIGH |
| 3 | APPLICATION 113 | 100ms | 70ms | CAN | ID0x100 | EFFECTIVE | - |

Fig. 4

OUTPUT TABLE (EMBODIMENT 1)

| OUTPUT ID | OUTPUT REQUEST | OUTPUT SETTING | OUTPUT DATA |
|---|---|---|---|
| 1 | ABSENCE⇒PRESENCE | EFFECTIVE⇒INEFFECTIVE | 0x01 |
| 2 | ABSENCE⇒PRESENCE | INEFFECTIVE⇒EFFECTIVE | -⇒0x00 |
| 3 | PRESENCE | EFFECTIVE | 0x12345678 |

Fig. 8

PARAMETER TABLE (EMBODIMENT 2)

| OUTPUT ID | APPLICATION ID | CYCLE | OUTPUT TIMING | ACCESS TYPE | OUTPUT DESTINATION | DEFAULT OUTPUT SETTING | PRIORITY |
|---|---|---|---|---|---|---|---|
| 1 | APPLICATION 111 | 100ms | 60ms | Digital Output | DEVICE 200 | EFFECTIVE | LOW |
| 2 | APPLICATION 112 | 20ms | 10ms | Digital Output | DEVICE 200 | INEFFECTIVE | HIGH |
| 3 | APPLICATION 113 | 100ms | 70ms | Digital Output | DEVICE 201 | EFFECTIVE | LOW |
| 4 | APPLICATION 113 | 100ms | 40ms | Digital Output | DEVICE 201 | INEFFECTIVE | HIGH |

Fig. 9

OUTPUT TABLE (EMBODIMENT 2)

| OUTPUT ID | OUTPUT REQUEST | OUTPUT SETTING | OUTPUT DATA |
|---|---|---|---|
| 1 | ABSENCE⇒PRESENCE | EFFECTIVE | 0x01 |
| 2 | ABSENCE⇒PRESENCE | INEFFECTIVE | 0x00 |
| 3 | ABSENCE⇒PRESENCE | EFFECTIVE⇒INEFFECTIVE | 0x01 |
| 4 | ABSENCE⇒PRESENCE | INEFFECTIVE⇒EFFECTIVE | --⇒0x00 |

Fig.10

PARAMETER TABLE (EMBODIMENT 3)

| OUTPUT ID | APPLICATION ID | CYCLE | OUTPUT TIMING | ACCESS TYPE | OUTPUT DESTINATION | DEFAULT OUTPUT SETTING | PRIORITY |
|---|---|---|---|---|---|---|---|
| 1 | APPLICATION 111 | 100ms | 60ms | Digital Output | DEVICE 200 | EFFECTIVE | LOW |
| 2 | APPLICATION 112 | 20ms | 10ms | Digital Output | DEVICE 200 | INEFFECTIVE | HIGH |
| 3 | APPLICATION 113 | 100ms | 70ms | Digital Output | DEVICE 201 | EFFECTIVE | MIDDLE |
| 4 | APPLICATION 113 | 100ms | 40ms | Digital Output | DEVICE 201 | EFFECTIVE | MIDDLE |

Fig. 12

PARAMETER TABLE (EMBODIMENT 4)

| OUTPUT ID | APPLICATION ID | CYCLE | OUTPUT TIMING | ACCESS TYPE | OUTPUT DESTINATION | DEFAULT OUTPUT SETTING | PRIORITY | RETRIEVAL TABLE ID |
|---|---|---|---|---|---|---|---|---|
| 1 | APPLICATION 111 | 100ms | 60ms | Digital Output | DEVICE 200 | EFFECTIVE | LOW | 1 |
| 2 | APPLICATION 112 | 20ms | 10ms | Digital Output | DEVICE 200 | INEFFECTIVE | HIGH | 1 |
| 3 | APPLICATION 113 | 100ms | 70ms | Digital Output | DEVICE 201 | EFFECTIVE | LOW | 2 |
| 4 | APPLICATION 113 | 100ms | 40ms | Digital Output | DEVICE 201 | INEFFECTIVE | HIGH | 2 |
| 5 | APPLICATION 113 | 100ms | 40ms | CAN | ID0x100 | EFFECTIVE | NONE | NONE |

Fig. 13

RETRIEVAL TABLE (EMBODIMENT 4)

| RETRIEVAL TABLE ID | PARAMETER TABLE OUTPUT ID1 | PARAMETER TABLE OUTPUT ID2 | PARAMETER TABLE OUTPUT ID3 |
|---|---|---|---|
| 1 | OUTPUT ID1 | OUTPUT ID2 | — |
| 2 | OUTPUT ID3 | OUTPUT ID4 | — |

Fig. 15

PARAMETER TABLE (EMBODIMENT 1)

| OUTPUT ID | APPLICATION ID | CYCLE | OUTPUT TIMING | ACCESS TYPE | OUTPUT DESTINATION | DEFAULT OUTPUT SETTING | PRIORITY |
|---|---|---|---|---|---|---|---|
| 1 | APPLICATION 111 | 100ms | 60ms | Digital Output | DEVICE 200 | EFFECTIVE | LOW |
| 2 | APPLICATION 112 | 20ms | 10ms | Digital Output | DEVICE 200 | INEFFECTIVE | MIDDLE |
| 3 | APPLICATION 113 | 100ms | 70ms | Digital Output | DEVICE 200 | INEFFECTIVE | HIGH |

DATA PROCESSING APPARATUS, DATA PROCESSING METHOD, AND COMPUTER READABLE MEDIUM

TECHNICAL FIELD

The present invention relates to a technique for controlling data output of an application program (hereinafter called an "application").

The following describes a technique for controlling data output of an application of an on-vehicle system mounted on a vehicle, as an example.

BACKGROUND ART

An on-vehicle system is equipped with various types of electronic devices. The number of on-vehicle control devices monuted (hereinafter called "electronic control units (ECUs)) for controlling these electronic devices has been increasing, along with multi-functionalization and complication of the on-vehicle system in recent years.

On the other hand, since a performance of an embeded central processing unit (CPU) for realizing an arithmetic process has been improving, a trend that multiple functions (applications) are realized by one ECU is accelerated. When multiple applications are realized by one ECU, the multiple applications share computational resources. Thus, process timing of an application and access timing of the application to an external network or an external device may be changed due to influence of the processing of another application. As a result, the application may operate at a timing different from that in the case where it operates alone. In response to this problem, a technique for controlling access timing of an application to the outside is disclosed.

For example, Patent Literature 1 discloses a method in which data to be transmitted to a network is temporarily stored in a database and a transmission process is controlled on the basis of preset information of a transmission timing.

CITATION LIST

Patent Literature

Patent Literature 1: JP2010-231407A

SUMMARY OF INVENTION

Technical Problem

In the Patent Literature 1, it is not considered that multiple applications access to one output destination. For example, it is assumed that a first application which operates in an ordinary time and a second application which operates only in an emergency output data to the same output destination.

In the emergency, the second application outputs data to the output destination. However, if the first application still operates in the same way as it operates in the ordinary time, the first application may output data to the same output destination after the second application outputs data.

There is a problem that when data is output from the first application to the same output destination after data is output from the second application, the data from the second application is overwritten and erased by the data from the first application.

A main object of the present invention is to solve the problem. The present invention mainly aims to prevent another application from outputting to the same output destination after data is output from an application which outputs data only in a specific case such as an emergency, that is, an application whose default output setting is set ineffective.

Solution to Problem

A data processing apparatus according to the present invention includes:

an output setting updating part to update, when data output is requested by an application whose default output setting is set ineffective among a plurality of applications, an output setting of the requesting application from ineffective to effective and update an output setting of another application which outputs data to the same output destination as the output destination of the requesting application and whose default output setting is set effective, from effective to ineffective; and an output control part to output data of an application whose output setting is effective.

Advantageous Effects of Invention

In the present invention, when data output is requested by an application whose default output setting is set ineffective, an output setting of the requesting application is updated from ineffective to effective, and an output setting is updated from effective to ineffective, of another application which outputs data to the same output destination as the output destination of the requesting application and whose default output setting is set effective.

Therefore, according to the present invention, after data is output from the application whose default output setting is set ineffective, no data is output from the another application to the same output destination.

BRIEF DESCRIPTION OF DRAWINGS

FIG. 3 illustrates an example of a parameter table according to the embodiment 1.

FIG. 4 illustrates an example of an output table according to the embodiment 1.

FIG. 8 illustrates an example of a parameter table according to an embodiment 2.

FIG. 9 illustrates an example of an output table according to the embodiment 2.

FIG. 10 illustrates an example of a parameter table according to an embodiment 3.

FIG. 12 illustrates an example of a parameter table according to the embodiment 4.

FIG. 13 illustrates an example of a retrieval table according to the embodiment 4.

FIG. 15 illustrates an example of a parameter table according to the embodiment 1.

DESCRIPTION OF EMBODIMENTS

Embodiment 1

* Description of Configuration *

Figure 1:
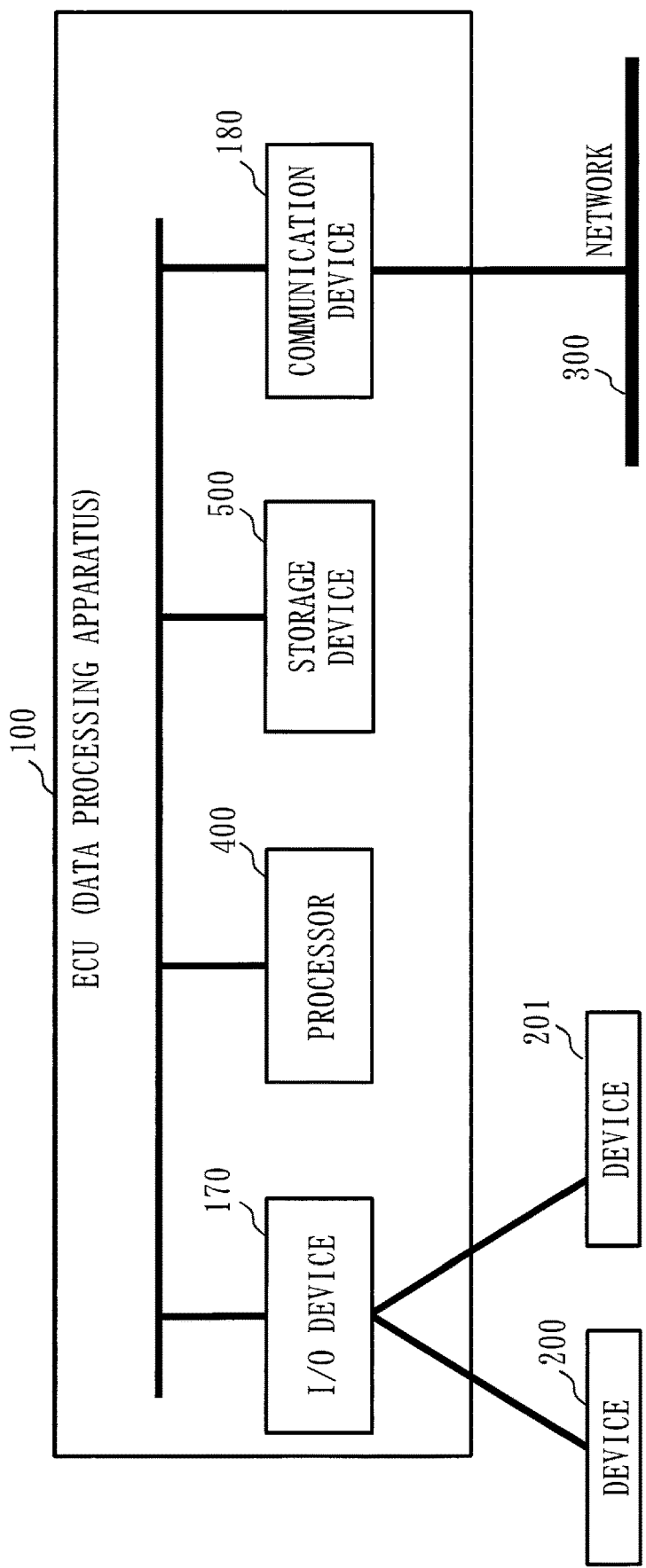
FIG. 1 illustrates a hardware configuration example of an ECU according to an embodiment 1.
Figure 2:
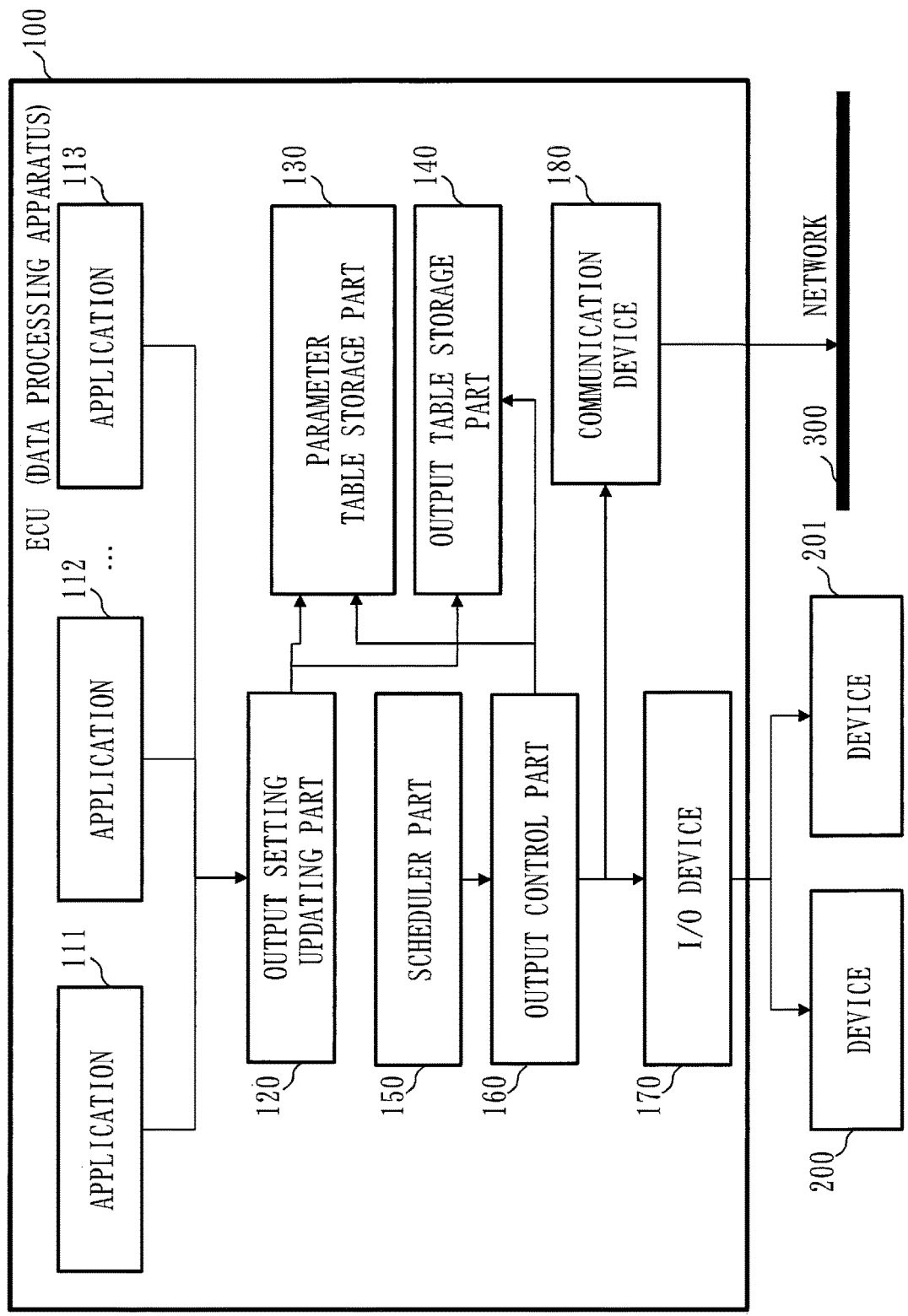
FIG. 2 illustrates a functional configuration example of the ECU according to the embodiment 1.

FIG. 1 illustrates a hardware configuration example of an ECU 100 according to the present embodiment. FIG. 2 illustrates a functional configuration example of the ECU 100 according to the present embodiment.

The ECU 100 is a computer.

The ECU 100 includes a processor 400, a storage device 500, an input/output (I/O) device 170, and a communication device 180 as hardware.

The processor 400, the storage device 500, the I/O device 170, and the communication device 180 are connected to each other by a bus.

The I/O device 170 is connected to devices 200 and 201 outside the ECU 100. The communication device 180 is connected to a network 300 outside the ECU 100.

The devices 200 and 201 are actuators, for example.

The network 300 is a controller area network (CAN), an Ethernet (registered trademark) or the like, for example.

The ECU 100 corresponds to an example of a data processing apparatus.

As illustrated in FIG. 2, the ECU 100 includes applications 111,112 and 113, an output setting updating part 120, a scheduler part 150, an output control part 160, a parameter table storage part 130, and an output table storage part 140 as a functional configuration.

Although three applications are illustrated in FIG. 2, the number of the applications may not be three.

The applications 111,112 and 113, the output setting updating part 120, the scheduler part 150, and the output control part 160 are realized by programs.

These programs are stored in the storage device 500. The processor 400 executes these programs to implement operations of the applications 111,112 and 113, the output setting updating part 120, the scheduler part 150, and the output control part 160, which will be described later.

The parameter table storage part 130 and the output table storage part 140 are realized by the storage device 500.

The processor 400 is an integrated circuit (IC) for performing processing, for example, a CPU.

The storage device 500 may be a random access memory (RAM), a read only memory (ROM), a flash memory, a hard disk drive (HDD), or the like.

The I/O device 170 is, for example, an interface device for the devices 200 and 201.

The communication device 180 includes a receiver that receives data and a transmitter that transmits data. The communication device 180 is a communication interface device such as a CAN controller, an Ethernet (registered trademark) controller or the like, for example.

* Description of Operation *

Next, operation of each element illustrated in FIG. 2 is described.

Each of the applications 111,112 and 113 starts data processing at unique cycle. Thereafter, the applications 111,112 and 113 each request the output setting updating part 120 to output data indicating results of the data processing.

The output setting updating part 120 accepts the data output request from each of the applications 111,112 and 113.

When data output is requested by an application whose default output setting is set "ineffective" among a plurality of applications, the output setting updating part 120 updates the output setting of the requesting application from "ineffective" to "effective". Moreover, the output setting updating part 120 updates an output setting of another application which outputs data to the same output destination as the output destination of the requesting application and whose default output setting is set "effective", from "effective" to "ineffective".

Hereinafter, the data that is requested to be output by an application is called "output data".

The default output setting is described in a parameter table. The output setting is described in an output table.

The parameter table is stored in the parameter table storage part 130. The output table is stored in the output table storage part 140.

Details of the parameter table and the output table will be described later.

The output control part 160 outputs an output data from an application whose output setting in the output table is set "effective", to a corresponding output destination.

When the output destination is the device 200 or 201, the output control part 160 transmits the output data to the I/O device 170 to cause the I/O device 170 to output the output data to the device 200 or 201. On the other hand, when the output destination is the network 300, the output control part 160 transmits the output data to the communication device 180 to cause the communication device 180 to output the output data to the network 300.

The parameter table storage part 130 stores the parameter table.

The parameter table defines an output timing, an output destination, and a default output setting of each application.

The parameter table storage part 130 is, for example, realized by a flash memory.

The output table storage part 140 stores the output table.

The output table includes a presence or absence of the output request, the output setting, and the output data.

The output table storage part 140 is, for example, realized by the RAM.

The scheduler part 150 manages an activation cycle of the output control part 160.

The scheduler part 150 may also manage activation of the applications 111,112 and 113.

The scheduler part 150 is, for example, realized by an operating system (OS).

FIG. 3 illustrates an example of the parameter table.

The parameter table is composed of an output ID, an application ID, a cycle, an output timing, an access type, an output destination, a default output setting, and a priority.

The output ID can be any type of identifier and may be a symbol or a number.

Identifiers of the applications 111,112 and 113 are described in the application ID. A symbol or a number may also be described in the application ID.

An application execution cycle is described in the cycle. When the same application ID is described in a plurality of records, the same cycles are described for the same application IDs.

A timing when the output data from the application is output to the outside of the ECU 100 is described in the output timing.

A type of the output data is described in the access type. The first and the second lines in FIG. 3 describe that digital signal is output. Alternatively, a name, a symbol, or a communication identifier of a network can also be described in the column of the access type.

An output destination of the output data is described in the output destination. For example, a name, a symbol, or a communication identifier for identifying a device or a network is described in the output destination.

A default value of the output setting is described in the default output setting. For an application which outputs its output data to the output destination at each cycle, the default output setting is set "effective". For an application which outputs its output data to the output destination only in a special case such as an emergency, the default output setting is set "ineffective".

The priority is a priority order between two or more applications having a common output destination. When an application whose default output setting is set "ineffective" is included in the two or more applications having the common output destination, the priority of the application whose default output setting is "ineffective" is higher than the priority of the application whose default output setting is "effective".

When the default output settings of two or more applications are set "ineffective" among two or more applications having the common output destination, the priorities need to be differentiated between the two or more applications whose default output settings are "ineffective". For example, it is assumed that three applications (applications 111,112 and 113) have a common output destination, and the default output settings of two applications (applications 112 and 113) are set "ineffective", as illustrated in the parameter table in FIG. 15. In this case, the priorities need to be differentiated between the applications 112 and 113. The priority of the application 111 whose default output setting is "effective" is the lowest among the three applications.

Each value in the parameter tables in FIGS. 3 and 15 is a static value and is not updated by the output setting updating part 120.

The first line (output ID 1) in the parameter table in FIG. 3 indicates that the application 111 operates at a cycle of 100 ms. The first line also indicates that the output data from the application 111 is output to the device 200 at a timing of 60 ms in the cycle of 100 ms. According to the first line, since the default output setting is "effective", the output data from the application 111 is output to the device 200 at every cycle.

The second line (output ID 2) in the parameter table indicates that the application 112 operates at a cycle of 20 ms. The second line also indicates that the output data from the application 112 is output to the device 200 at a timing of 10 ms in the cycle of 20 ms. According to the second line, since the default output setting is "ineffective", the output data from the application 112 is output to the device 200 only in a special case such as an emergency. The application 112, for example, monitors a monitoring target and outputs output data for indicating an abnormality of the monitoring target if there is the abnormality on the monitoring target.

The third line (output ID 3) in the parameter table indicates that the application 113 operates at a cycle of 100 ms. The third line also indicates that the output data from the application 113 is output to the CAN, that is, the network 300, at a timing of 70 ms in the cycle of 100 ms. According to the third line, since the default output setting is "effective", the output data from the application 113 is output to the network 300 at every cycle.

FIG. 4 illustrates an example of the output table.

The output table is composed of an output ID, an output request, an output setting, and an output data.

The identifier that is the same as that of the output ID in the parameter table is described in the output ID.

A presence or absence of the output request from the application is described in the output request.

A current output setting is described in the output setting.

The output data from an application is stored in the output data.

Values of the output request and the output setting are updated by the output setting updating part 120.

That is, until when an output request is issued from an application, the value of the output request is "absence". Then, when accepting the output request from an application, the output setting updating part 120 updates the value of the output request to "presence".

The initial value of the output setting of an application whose default output setting is "effective" is "effective". The initial value of the output setting of an application whose default output setting is "ineffective" is "ineffective".

Since the default output setting of the application 111 in the first line (output ID 1) in the parameter table is "effective", the initial value of the output setting in the first line (output ID 1) in the output table is "effective". Similarly, since the default output setting of the application 112 in the second line (output ID 2) in the parameter table is "ineffective", the initial value of the output setting in the second line (output ID 2) in the output table is "ineffective".

When accepting an output request from the application 112 whose default output setting is "ineffective", the output setting updating part 120 updates the value of the output setting in the second line (output ID 2) in the output table from "ineffective" to "effective". Moreover, the output setting updating part 120 updates the value of the output setting in the first line (output ID 1) in the output table from "effective" to "ineffective", the first line (output ID 1) corresponding to the application 111 whose output destination is the same as that of the application 112 and whose default output setting is "effective".

The output control part 160 refers to the values of the output request and the output setting in the output table to determine whether to output of the output data is permitted.

Data specified by the access type in the parameter table is stored in the output data. For example, since the access type in the first line (output ID 1) in the parameter table is digital signal output, 1 bit data is written in the output data in the first line (output ID 1) in the output table.

In the present embodiment, the application 111 operates at a cycle of 100 ms, the application 112 operates at a cycle of 20 ms, and the application 113 operates at a cycle of 100 ms.

The application 111 generates output data for the device 200 and requests the output setting updating part 120 to output the output data, at every cycle.

In a specific condition, for example, in an emergency, the application 112 generates output data for the device 200, which is the output destination of the application 111, and requests the output setting updating part 120 to output the output data. For example, the application 112 generates an instruction for stopping the device 200 as the output data in an emergency.

Figure 5:
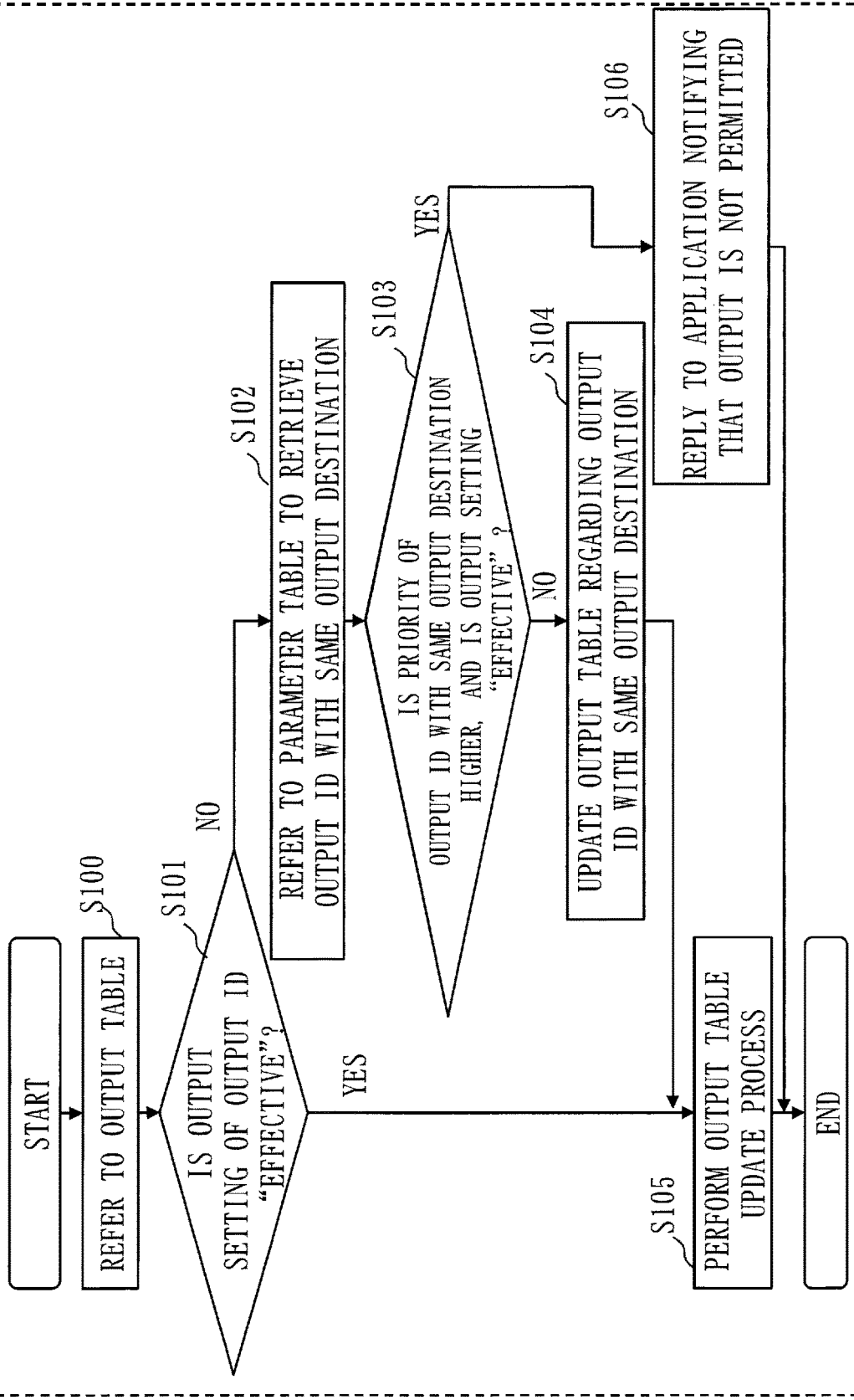
FIG. 5 is a flowchart illustrating an operation example of an output setting updating part according to the embodiment 1.

FIG. 5 is a flowchart illustrating an operation example of the output setting updating part 120.

The operation example of the output setting updating part 120 illustrated in FIG. 5 corresponds to an example of an output setting updating process.

The output setting updating part 120 is called by the application which has generated the output data.

When the application 111 requests the output setting updating part 120 to output the output data, the application 111 adds the output ID 1 to the output data and transmits the output data with the output ID 1 attached thereto to the output setting updating part 120 as the output request.

Upon receiving the output request, the output setting updating part 120 refers to the output table illustrated in FIG. 4 in step S100.

Then, in step S101, the output setting updating part 120 checks whether the output setting in the output table is "effective".

In the example in FIG. 4, since the output setting of the output ID 1 is "effective", the determination in step S101 is "YES", and the process proceeds to step S105.

In step S105, the output setting updating part 120 updates the output table.

Specifically, the output setting updating part 120 updates the output request in the output table from "absence" to "presence" and writes the output data in the output table.

When the application 112 requests the output setting updating part 120 to output the output data, the application 112 adds the output ID 2 to the output data and transmits the output data with the output ID 2 attached thereto to the output setting updating part 120 as the output request.

In step S100, the output setting updating part 120 refers to the output table.

In the example in FIG. 4, since the output setting of the output ID 2 is "ineffective", the determination in step S101 is "NO", and the process proceeds to step S102.

In step S102, the output setting updating part 120 refers to the parameter table to retrieve an output ID for which the same output destination as the output destination of the output ID whose output setting is determined to be "ineffective" in step S102 is described. That is, the output setting updating part 120 retrieves an output ID of an application which outputs data to the same output destination as the output destination of the requesting application of the output request.

In the example in FIG. 3, since the output destination of the output ID 2 is the device 200, the output setting updating part 120 retrieves the parameter table for an output ID whose output destination is the device 200. As a result of the retrieval, the output setting updating part 120 acquire the output ID 1 whose output destination is the device 200.

Next, in step S103, the output setting updating part 120 determines whether the priority of the output ID acquired in step S102 is higher the priority of the output ID whose output setting is "ineffective" and determines whether the output setting of the output ID acquired in step S102 is "effective" in the output table.

The output setting of the output ID 1 retrieved in step S102 is "effective" in the output table, but the priority is lower than that of the output ID 2.

When the determination in step S103 is "YES", the output setting updating part 120 notifies the requesting application that output of the output data is not permitted in step S106 and terminates the process for the output request.

On the other hand, when the determination in step S103 is "NO", the output setting updating part 120 updates the output setting of the output ID retrieved in step S102 from "effective" to "ineffective" in step S104, if the output setting is "effective". Moreover, in step S105, the output setting updating part 120 updates the output request of the output ID whose output setting is "ineffective" from "absence" to "presence", updates the output setting from "ineffective" to "effective", and writes the output data in the output table.

As described above, since the priority of the output ID 1 is lower than the priority of the output ID 2, the determination is step S103 is "NO". Thus, in step S105, the output setting updating part 120 updates the output request of the output ID 2 from "absence" to "presence", updates the output setting from "ineffective" to "effective", and writes the output data in the output table. Moreover, the output setting updating part 120 updates the output setting of the output ID 1 in the output table from "ineffective" to "effective" in step S104.

As in the parameter table in FIG. 3, when two applications shares the output destination, the default output setting of one of these applications is "effective" and the default output setting of the other application is "ineffective", since the priority of the other application whose default output setting is "ineffective" is higher, the determination in step S103 is "NO" at any time. Thus, when the output setting updating part 120 is requested to output the output data by an application (application 112) whose default output setting is set "ineffective" among a plurality of applications (applications 111 and 112), the output setting updating part 120 updates the output setting in the output table of the requesting application (application 112) from "ineffective" to "effective". Moreover, the output setting updating part 120 updates the output setting of the other application (application 111) which outputs data to the same output destination as the output destination of the requesting application and whose default output setting is set "effective", from "effective" to "ineffective".

As in the parameter table in FIG. 15, when three or more applications shares the output destination, and the default output settings of two or more of these applications are set "ineffective", the output setting updating part 120 determines whether to update the output table, on the basis of the priorities between the applications whose default settings are "ineffective" and the output settings in the output table. When the output setting updating part 120 is requested to output the output data by an application (for example, application 112) whose default output setting is set "ineffective" among a plurality of applications (applications 111,112 and 113), the output setting updating part 120 updates the output setting of the requesting application (application 112) from "ineffective" to "effective" unless the output setting in the output table is set "effective" to an application (application 113) which outputs data to the same output destination as the output destination of the requesting application (application 112), whose default output setting is set "ineffective", and whose priority is higher than the priority of the requesting application. Moreover, the output setting updating part 120 updates the output setting in the output table of the other application (application 111) which outputs data to the same output destination as the upset destination of the requesting application and whose default output setting is set "effective", from "effective" to "ineffective".

In the example of the parameter table in FIG. 3, when the output request of the application 112 is issued before the output request of the application 111 within the cycle of the application 111, the output data of the application 111 is not output.

That is, because of the output request from the application 112, the output setting of the output ID 1 has been updated to "ineffective" in step S105, and therefore, the determination in step S101 is "NO". Then, in step S102, the parameter table (FIG. 3) is referred to, and the output ID 2 is extracted, whose output destination is the device 200 which is also the output destination of the output ID 1. Since the priority of the output ID 2 is higher than that of the output ID 1 and the output setting of the output ID 2 is "effective" (already updated in step S105), the determination in step S103 is "YES".

As a result, in step S106, the output setting updating part 120 notifies the application 111 that output of the output data is not permitted.

In the example of the parameter table in FIG. 15, when the output request of the application 113 issued before the output request of the application 112 within the cycle of the application 112, the output data of the application 112 is not output.

That is, as for the output request of the application 112, since the output setting is "ineffective", the determination in step S101 is "NO". Then, in step S102, the parameter table (FIG. 15) is referred to, and the output ID 3 is extracted, whose output destination is the device 200 which is also the output destination of the output ID 2. Since the priority of the output ID 3 is higher than that of the output ID 2 and the output setting of the output ID 3 is "effective" (already updated in step S105), the determination in step S103 is "YES".

As a result, in step S106, the output setting updating part 120 notifies the application 112 that the output of the output data is not permitted.

Figure 6:
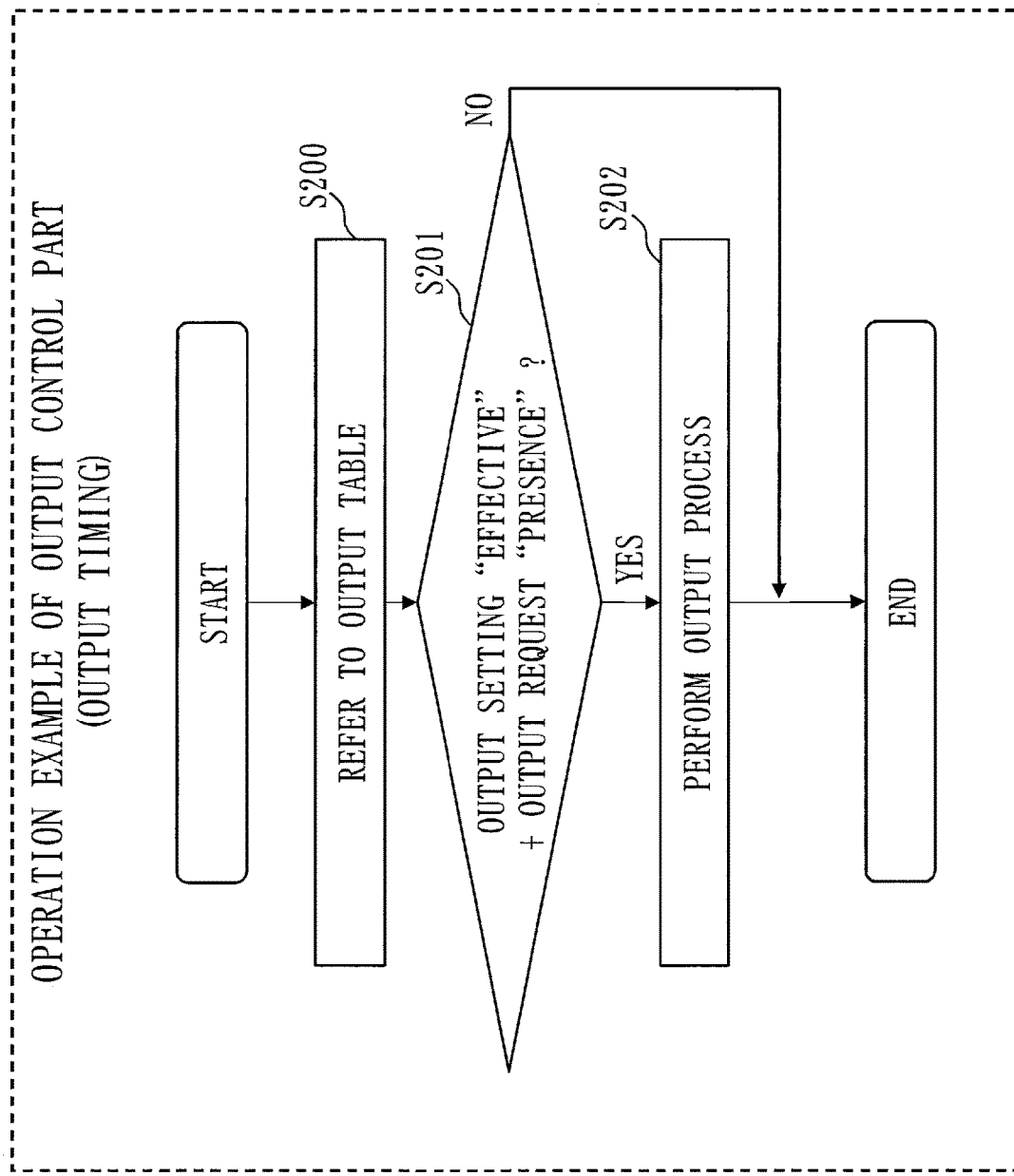
FIG. 6 is a flowchart illustrating an operation example of an output control part according to the embodiment 1.

FIG. 6 illustrates a flowchart of the output control part 160 at output timing.

The operation example of the output control part 160 illustrated in FIG. 6 corresponds to an example of an output control process.

The output control part 160 is activated by the scheduler part 150 at the output timing described in the parameter table. For example, as for the output ID 1 in the parameter table, the output control part 160 is activated at a timing of 60 ms (at a time point when 60 ms passes after the application 111 is activated) that is described in the output timing.

When activated, the output control part 160 refers to the output table in step S200.

When the output request is "presence" and the output setting is "effective" with respect to the corresponding output ID (step S201 is "YES") in the output table, the output control part 160 executes the output process in step S202. That is, the output control part 160 outputs the output data to the output destination.

On the other hand, when conditions are not satisfied in S201, the output control part 160 terminates the process without executing the output process.

Figure 7:
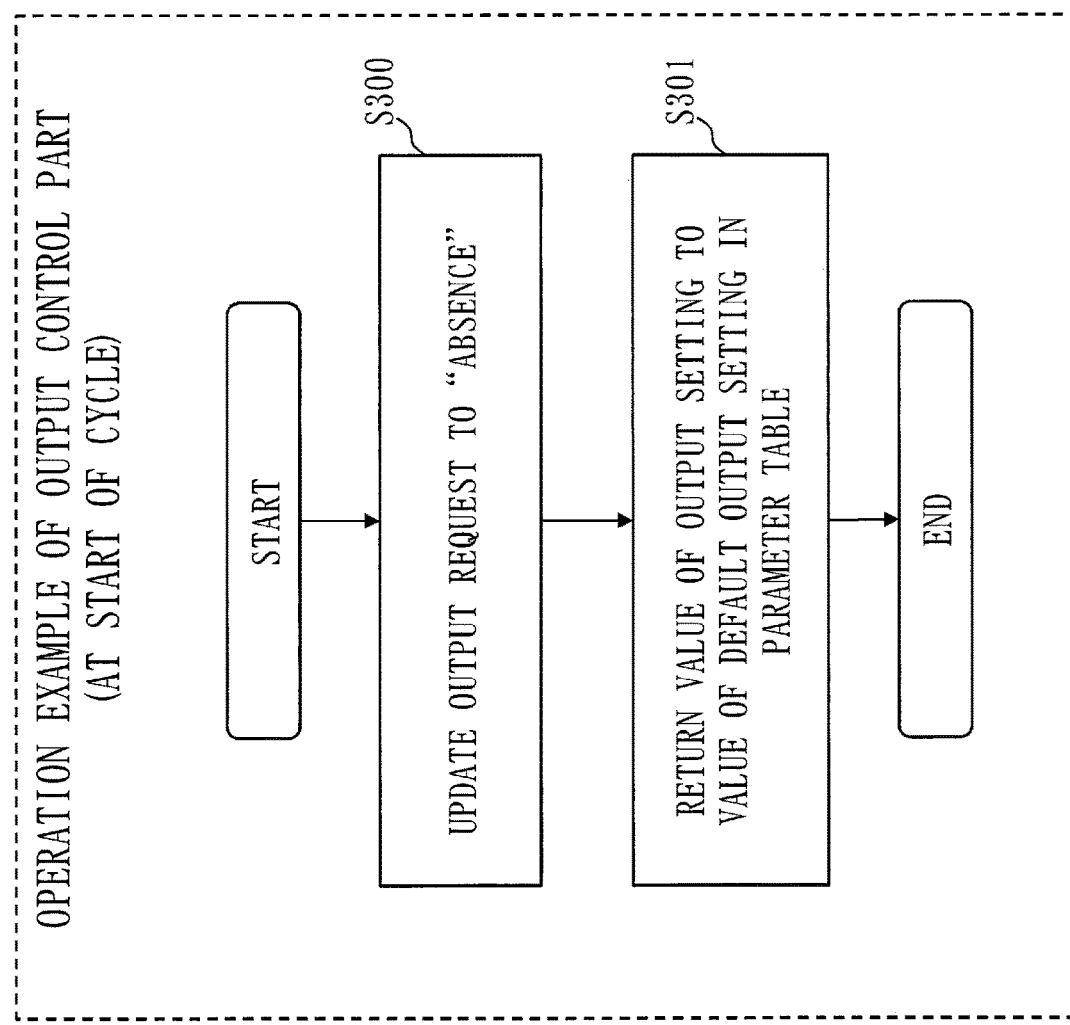
FIG. 7 is a flowchart illustrating an operation example of the output control part according to the embodiment 1.

FIG. 7 illustrates a flowchart of the output control part 160 at start of a cycle.

The operation example of the output control part 160 illustrated in FIG. 7 also corresponds to an example of the output controlling process.

In addition to the output timing defined in the parameter table, the output control part 160 is also activated at a timing for each application to start data processing. That is, the output control part 160 is activated by the scheduler part 150 at the timing of the cycle in the parameter table and initializes the output table.

According to the parameter table in FIG. 3, the application 111 is activated at a cycle of 100 ms, the application 112 is activated at a cycle of 20 ms, and the application 113 is activated at a cycle of 100 ms. Therefore, the output control part 160 is activated at the start of each of the cycles.

For example, when activated at the start of the cycle of the application 111, the output control part 160 updates the output request of the output ID 1 in the output table to "absence" in step S300.

Moreover, the output control part 160 returns the output setting of the output ID 1 in the output table to "effective" which is the value of the default output setting in the parameter table, in step S301.

If the application 111 uses a plurality of output IDs, the output control part 160 performs the same process to each of the output IDs.

The operation procedures illustrated in FIGS. 5 to 7 correspond to examples of a data processing method and a data processing program.

* Description of Effects of the Embodiment *

According to the present embodiment, even when output requests to the same output destination are issued by a plurality of applications at different timings, it can be determined whether executions of the output processes are permitted on the basis of priorities. Therefore, even if an order of processing and an order of the output timing between the applications are inconsistent, unintended output operation can be prevented.

In the present embodiment, when output of data is requested by an application whose default output setting is set ineffective, an output setting of the requesting application is updated from ineffective to effective, and an output setting of another application is updated from effective to ineffective, which outputs data to the same output destination as the output destination of the requesting application and whose default output setting is set effective.

Thus, according to the present embodiment, after data from the application whose default output setting is set ineffective is output, data from the another application is not output to the same output destination.

Accordingly, if the default output setting of a first application which outputs data in an ordinary time is set effective, and the default output setting of a second application which outputs data in an emergency is set ineffective, it is possible to avoid a situation where, in an emergency, the output data from the second application is output, then the output data from the first application is output. That is, according to the present embodiment, it is possible to avoid a situation where the output data from the second application is overwritten and erased by the output data from the first application.

Embodiment 2

In the present embodiment, differences from the embodiment 1 are mainly described.

The matters not described in the following descriptions are the same as those in the embodiment 1.

* Description of Configuration *

A hardware configuration example and a functional configuration example of the ECU 100 according to the present embodiment are the same as those in the embodiment 1.

FIG. 8 illustrates an example of a parameter table of the ECU 100 according to an embodiment 2.

The descriptions of the output IDs 1 and 2 are the same as those in the parameter table in FIG. 3.

For the output ID 3, it is described that an application 113 operates at a cycle of 100 ms and outputs output data to the device 201 at a timing of 70 ms in the cycle of 100 ms. In addition, for the output ID 3, the default output setting is "effective".

For the output ID 4, it is described that the application 113 operates at a cycle of 100 ms and outputs output data to the device 201 at a timing of 40 ms in the cycle of 100 ms. In addition, for the output ID 4, the default output setting is "ineffective".

Since the default output setting of the output ID 4 is "ineffective" and the default output setting of the output ID 3 is "effective", the priority of the output ID 4 is higher than the priority of the output ID 3.

In the present embodiment, the application 113 externally outputs at two different timings, to the device 201 which is an output destination. For example, it is assumed that data is output at the timing of 70 ms in the cycle of 100 ms in accordance with the output ID 3 in the parameter table in an ordinary time and data is output at the timing of 40 ms in the cycle of 100 ms to stop the device 201 in an emergency.

Hereinafter, the output timing specified in the output ID 3 is called a "first output timing", and the output timing specified in the output ID 4 is called a "second output timing".

FIG. 9 illustrates an example of an output table according to the embodiment 2.

The meaning of each item in the output table in FIG. 9 is the same as that in the output table in FIG. 4.

The output table in FIG. 9 manages the output IDs 1 to 4 in accordance with the parameter table in FIG. 8. The output setting of the output ID 3 can be updated from "effective" to "ineffective", and the output setting of the output ID 4 can be updated from "ineffective" to "effective".

* Description of Operation *

In the present embodiment, as described above, the first data output timing and the second data output timing are set for the application 113 as timings for outputting data. An output destination at the first output timing and an output destination at the second data output timing are the same. The default output setting for the first data output timing is set "effective", and the default output setting for the second data output timing is set "ineffective".

The application 113 adds one of the output ID 3 and the output ID 4 to the output data and transmits an output request to the output setting updating part 120.

When the application 113 requests output of the data at the second data output timing, that is, when the application 113 adds the output ID 4 to the output data, the output setting updating part 120 updates the output setting of the output ID 4 from "ineffective" to "effective" and updates the output setting of the output ID 3 from "effective" to "ineffective" in the output table.

When the application 113 requests output of the data at the first data output timing, that is, when the application 113 adds the output ID 3 to the output data, the output setting updating part 120 updates no value of the output setting in the output table.

The output control part 160 outputs the output data of the output ID whose output setting is "effective", to the device 201 which is an output destination.

Also in the present embodiment, the output setting updating part 120 operates in accordance with the flow illustrated in FIG. 5, and the output control part 160 operates in accordance with the flows illustrated in FIGS. 6 and 7.

* Description of Effects of the Embodiment *

According to the present embodiment, when the application intends to output data for an ordinary time and data for an emergency to the same output destination, one of the outputs is selected based on the priority.

Embodiment 3

In the present embodiment, differences from the embodiment 1 are mainly described.

The matters not described in the following descriptions are the same as those in the embodiment 1.

* Description of Configuration *

A hardware configuration example and a functional configuration example of the ECU 100 according to the present embodiment are the same as those in the embodiment 1.

FIG. 10 illustrates an example of a parameter table of the ECU 100 according to the embodiment 3.

The descriptions of the output IDs 1 and 2 are the same as those in the parameter table in FIG. 3.

For the output ID 3, it is described that an application 113 operates at a cycle of 100 ms and outputs output data to the device 201 at a timing of 70 ms in the cycle of 100 ms. In addition, for the output ID 3, the default output setting is "effective".

For the output ID 4, it is described that the application 113 operates at a cycle of 100 ms and outputs output data to the device 201 at a timing of 40 ms in the cycle of 100 ms. In addition, for the output ID 4, the default output setting is "effective".

The differences from the embodiment 2 are that the default output setting of each of the output IDs 3 and 4 is "effective" and the priorities are the same.

* Description of Operation *

In the embodiment 3, the application 113 outputs data to the device 201 which is the output destination multiple times at different timings.

The application 113 adds one of the output IDs 3 and 4 to the output data and transmits an output request to the output setting updating part 120.

The output setting updating part 120 updates the output table in accordance with the flow illustrated in FIG. 5. Since the output settings of both of the output IDs 3 and 4 are "effective", the determination in step S101 is "YES" at any time, and the output setting updating part 120 updates the output request in the output table from "absence" to "presence" and writes the output data in the output table in step S105.

The output control part 160 operates in accordance with the flows illustrated in FIGS. 6 and 7.

* Description of Effects of the Embodiment *

According to the present embodiment, when the application outputs data to the same output destination multiple times at different timings, all of the data can be output.

Embodiment 4

In the present embodiment, differences from the embodiment 1 are mainly described.

The matters not described in the following descriptions are the same as those in the embodiment 1.

* Description of Configuration *

Figure 11:
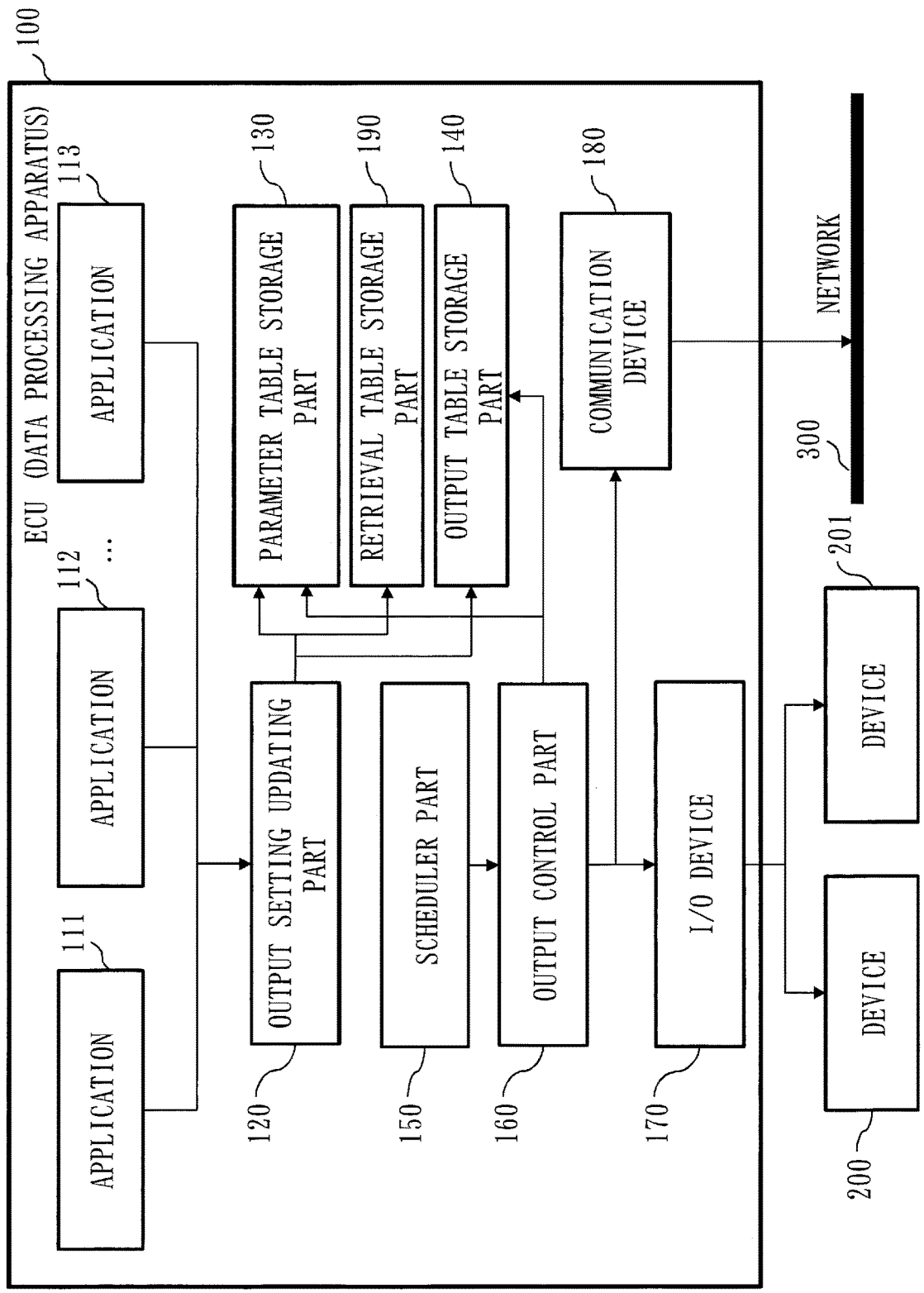
FIG. 11 illustrates a functional configuration example of an ECU according to an embodiment 4.

FIG. 11 illustrates a functional configuration example of the ECU 100 according to the embodiment 4.

A difference from the configuration in FIG. 2 is a retrieval table storage part 190.

The retrieval table storage part 190 stores a retrieval table.

In the retrieval table, an application whose default output setting is set "ineffective" and an application whose default output setting is set "effective", which have a common output destination, are associated.

In the present embodiment, the output setting updating part 120 refers to the retrieval table and identifies another application which outputs data to the same output destination as the output destination of the output-requesting application and whose default output setting is set "effective".

FIG. 13 illustrates an example of the retrieval table.

The retrieval table in FIG. 13 corresponds to the parameter table in FIG. 12.

First, the parameter table in FIG. 12 is described.

According to the parameter table in FIG. 12, the output IDs 1 and 2 are set to output to the device 200. Further, the output IDs 3 and 4 are set to output to the device 201.

In the present embodiment, an item of the retrieval table ID is added, compared to the parameter tables in FIGS. 3 and 10.

Next, the retrieval table in FIG. 13 is described.

The retrieval table is composed of retrieval table ID and parameter table output IDs.

The value of the retrieval table ID in the parameter table is described in the retrieval table ID.

The output ID in the parameter table, which has a common output destination, is described in each of the parameter table output IDs.

According to the parameter table in FIG. 12, output destinations of the output IDs 1 and 2 are the same. Thus, in the parameter table output IDs 1 and 2 of the retrieval table ID 1 in the retrieval table of FIG. 13, the output IDs 1 and 2 are described respectively. According to the parameter table in FIG. 12, output destinations of the output IDs 3 and 4 are the same. Thus, in the parameter table output IDs 1 and 2 of the retrieval table ID 2 in the retrieval table of FIG. 13, the output IDs 3 and 4 are described respectively.

* Description of Operation *

Figure 14:
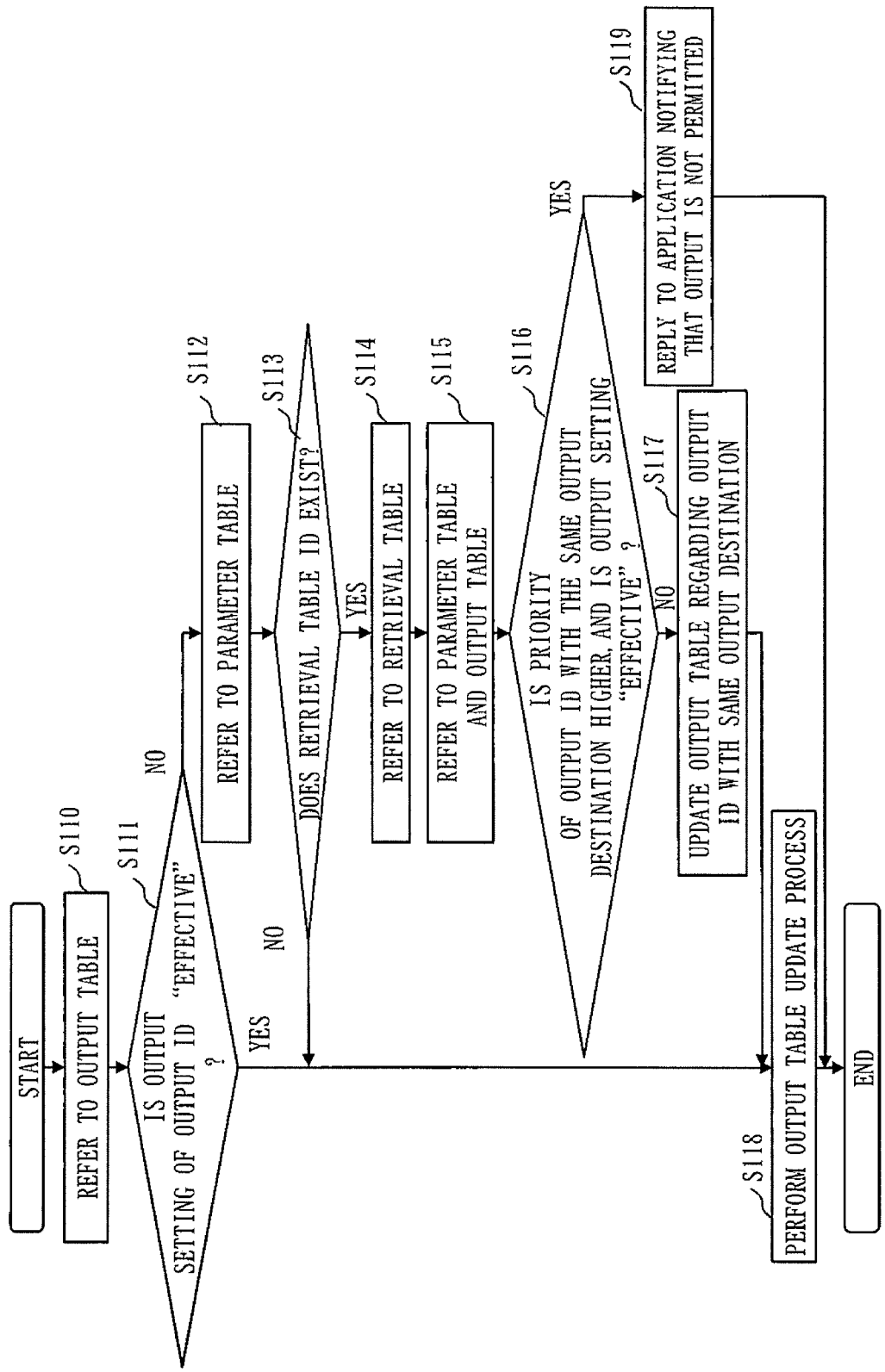
FIG. 14 is a flowchart illustrating an operation example of an output setting updating part according to the embodiment 4.

FIG. 14 illustrates an operation example of the output setting updating part 120 according to the present embodiment.

Steps S110 and S111 are the same as steps S100 and S101 in FIG. 5, and therefore, descriptions thereof are omitted.

When the determination in step S111 is "NO", the output setting updating part 120 refers to the parameter table in step S112. Specifically, the output setting updating part 120 refers to the retrieval table ID of the output ID that is subject to output.

When there is no retrieval table ID (step S113 is "NO"), no other output ID whose output destination is the same as that of the output-requesting output ID exists, and thus, the output table is updated in step S118.

In step S118, the output setting updating part 120 updates the output request in the output table from "absence" to "presence", updates the output setting from "ineffective" to "effective", and writes the output data in the output table.

On the other hand, when there is a retrieval table ID (step S113 is "YES"), the output setting updating part 120 refers to the retrieval table in step S114. Specifically, the output setting updating part 120 refers to the parameter table output IDs in the record of the retrieval table ID acquired in step S113 in the retrieval table.

Moreover, the output setting updating part 120 acquires another output ID whose output destination is the same as that of the output-requesting output ID, from among the parameter table output IDs.

For example, when the output ID 2 is added to the output data, the output setting updating part 120 acquires the retrieval table ID 1 from the parameter table and acquires the output ID 1 described in the record of the retrieval table ID 1, from the retrieval table.

Next, in step S115, the output setting updating part 120 refers to the priority of the acquired other output ID in the parameter table and also refers to the output setting of the acquired other output ID in the output table.

Then, in step S116, the output setting updating part 120 operates in a similar manner as in step S103 in FIG. 5.

That is, the output setting updating part 120 determines whether the priority of other output ID is higher than the priority of the output-requesting output ID and whether the output setting of the other output ID is "effective".

When the determination in step S116 is "YES", the output setting updating part 120 notifies the output-requesting application that output of the output data is not permitted in step S119 and terminates the process for the output request.

On the other hand, when the determination in step S116 is "NO", the output setting updating part 120 updates the output setting of the other output ID retrieved in step S113 from "effective" to "ineffective" in step S117. In step S118, the output setting updating part 120 updates the output request from "absence" to "presence" and updates the output setting from "ineffective" to "effective", with respect to the output-requesting output ID, and writes the output data in the output table.

* Description of Effects of the Embodiment *

According to the present embodiment, an application whose output destination is the same as that of the output-requesting application can be quickly retrieved. In the embodiments 1 to 3, in order to retrieve an application whose output destination is the same as that of the output-requesting application, it is necessary to refer to the parameter table entirely. In contrast, in the present embodiment, by using the retrieval table, it is possible to complete retrieval quickly and to save the computational resources.

Among the embodiments of the invention described above, two or more of these embodiments may be practiced in combination with each other.

Alternatively, one of these embodiments may be partially practiced.

Alternatively, two or more of these embodiments may be practiced partially in combination with each other.

The invention is not limited to these embodiments and may be modified as necessary.

* Description of Hardware Configuration *

Finally, a supplementary explanation of the hardware configuration of the ECU 100 is described.

Although one processor 400 is illustrated in FIG. 1, the ECU 100 may include a plurality of processors 400.

In addition, information, data, signal values, and variable values indicating results of processing of the applications 111,112 and 113, the output setting updating part 120, the scheduler part 150, and the output control part 160 are stored in the storage device 500 or a register or a cache memory in the processor 400.

Programs to realize functions of the applications 111,112 and 113, the output setting updating part 120, the scheduler part 150, and the output control part 160 may be stored in a portable storage medium, such as a magnetic disk, a flexible disk, an optical disc, a compact disc, a blue-ray (registered trademark) disc, or a DVD.

The ECU 100 may be realized by an electronic circuit such as a logic IC, a gate array (GA), an application specific integrated circuit (ASIC), or a field programmable gate array (FPGA).

The processor and the electronic circuit are collectively called a processing circuitry.

REFERENCE SIGNS LIST

100: ECU, 111: application, 112: application, 113: application, 120: output setting updating part, 130: parameter table storage part, 140: output table storage part, 150: scheduler part, 160: output control part, 170: I/O device, 180: communication device, 190: retrieval table storage part, 200: device, 201: device, 300: network, 400: processor, 500: storage device

The invention claimed is:

1. A data processing apparatus comprising:
a memory to store an output table which stores output requests from a plurality of applications, wherein a first application of the plurality of applications has a default output setting of ineffective and a second application of the plurality of applications has a default output setting of effective, output destinations of the applications being the same output destination,
processing circuitry to:
update, in the output table when data output is requested by the first application, an output setting of the first application from ineffective to effective and update, in the output table, an output setting of the second application, from effective to ineffective; and
output, to the output destination, data only of the application that has an output setting of effective based on output settings stored in the output table.

2. The data processing apparatus according to claim 1, wherein
a priority is set for each of the plurality of applications, and
when an output setting of a third application, which outputs data to the same output destination as the first and second applications, is set to ineffective, and to which a priority higher than the priority of the first application is set, the processing circuitry updates the output setting of the first application from ineffective to effective.

3. The data processing apparatus according to claim 1, wherein
each of the plurality of applications starts data processing at unique cycle, and
the processing circuitry returns the output setting of each application in the output table to the default output setting at a timing when each application starts the data processing.

4. The data processing apparatus according to claim 1, wherein
when data output at a second data output timing is requested by an application to which a first data output timing and the second data output timing are set as timings for outputting data, an output destination at the first output timing and an output destination at the second data output timing being the same, a default output setting for the first data output timing being set effective, and a default output setting for the second data output timing being set ineffective,
the processing circuitry updates an output setting for the second data output timing in the output table from ineffective to effective and updates an output setting for the first data output timing in the output table from effective to ineffective, and
outputs to the output destination, the data of the application which is requested to be output at a timing whose output setting is effective in the output table.

5. The data processing apparatus according to claim 1, further comprising a memory to store a retrieval table in which an application whose default output setting is set ineffective and an application whose default output setting is set effective are associated, output destinations of the applications being the same,
wherein the processing circuitry refers to the retrieval table and identifies another application which outputs data to the same output destination as the output destination of the requesting application and whose default output setting is set effective.

6. The data processing apparatus according to claim 1, wherein
when data output is requested by an application which monitors a monitoring target and outputs data indicating an abnormality of the monitoring target if there is the abnormality on the monitoring target, and whose default output setting is set ineffective,
the processing circuitry updates, in the output table, an output setting of the requesting application which has requested the data output, from ineffective to effective, and updates, in the output table, an output setting of another application which outputs data to the same output destination as the output destination of the requesting application and whose default output setting is set effective, from effective to ineffective.

7. A data processing method comprising:
storing an output table which stores output requests form a plurality of applications, wherein a first application of the plurality of applications has a default output setting of ineffective and a second application of the plurality of applications has a default output setting of effective, output destinations of the applications being the same output destination,
updating, in the output table when data output is requested by the first application, an output setting of the first application from ineffective to effective and updating, in the output table, an output setting of the second application, from effective to ineffective; and
outputting, to the output destination, data only of the application that has an output setting of effective based on output settings stored in the output table.

8. A non-transitory computer readable medium storing a data processing program causing a computer to execute:
storing an output table which stores output requests from a plurality of applications, wherein a first application of the plurality of applications has a default output setting of ineffective and a second application of the plurality of applications has a default output setting of effective, output destinations of the applications being the same output destination
an output setting updating process of updating, in the output table when data output is requested by the first application an output setting of the first application from ineffective to effective and updating, in the output table, an output setting of the second application from effective to ineffective; and
an output control process of outputting only data, to the output destination, of the application that has an output setting of effective based on output settings stored in the output table.

* * * * *